(12) United States Patent
Wong et al.

(10) Patent No.: US 12,221,033 B2
(45) Date of Patent: Feb. 11, 2025

(54) DYNAMIC AUTOMOTIVE TURN SIGNAL CIRCUIT AND DYNAMIC AUTOMOTIVE TURN SIGNAL SYSTEM

(71) Applicant: Joulwatt Technology Co., Ltd., Hangzhou (CN)

(72) Inventors: Pitleong Wong, Hangzhou (CN); Jianyu Xie, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 265 days.

(21) Appl. No.: 17/982,308

(22) Filed: Nov. 7, 2022

(65) Prior Publication Data
US 2023/0147234 A1 May 11, 2023

(30) Foreign Application Priority Data
Nov. 5, 2021 (CN) .......................... 202111305268.2

(51) Int. Cl.
*B60Q 1/34* (2006.01)
*F21S 43/14* (2018.01)
*F21Y 115/10* (2016.01)

(52) U.S. Cl.
CPC ................ *B60Q 1/34* (2013.01); *F21S 43/14* (2018.01); *F21Y 2115/10* (2016.08)

(58) Field of Classification Search
CPC .. B60Q 1/34; B60Q 1/381; F21S 43/14; F21S 43/15; F21Y 2115/10; H05B 47/16; H05B 45/30; F21W 2103/20; Y02B 20/40
See application file for complete search history.

(56) References Cited

U.S. PATENT DOCUMENTS

2023/0147234 A1* 5/2023 Wong ....................... B60Q 1/34
362/511

FOREIGN PATENT DOCUMENTS

CN         109556070     *    4/2019  ............. F21S 41/00

* cited by examiner

*Primary Examiner* — Minh D A
(74) *Attorney, Agent, or Firm* — Bayramoglu Law Offices LLC

(57) ABSTRACT

A dynamic automotive turn signal circuit includes at least one drive control module configured to receive a power supply signal from a body control module (BCM) to start operation, where the drive control module outputs first control signals at different delays through a delay unit; and a light emitting diode (LED) light set connected to the drive control module and lit based on the first control signals. A dynamic automotive turn signal system is further provided. The dynamic automotive turn signal circuit and the dynamic automotive turn signal system uses an external resistor to preset a high-precision delay circuit to realize the function of dynamic flowing turn signals. The external resistor can be used to configure a turn-on delay and a turn-off delay of the internal driver chip, such that the channel turn-on time and turn-off time can be flexibly adjusted.

11 Claims, 2 Drawing Sheets

DYNAMIC AUTOMOTIVE TURN SIGNAL CIRCUIT AND DYNAMIC AUTOMOTIVE TURN SIGNAL SYSTEM

CROSS REFERENCE TO THE RELATED APPLICATION

The present invention is based on and claims foreign priority to Chinese patent application No. 202111305268.2 filed Nov. 5, 2021, the entire content of which is incorporated herein by reference.

TECHNICAL FIELD

This application relates to the field of automotive signal technologies, and more specifically, to a dynamic automotive turn signal circuit.

BACKGROUND

As an important signaling device in automotive lights, turn signals have the important function of alerting surrounding vehicles and pedestrians when the vehicle is turning. According to the regulations, all the light emitting diode (LED) light strings of the turn signals need to be lit within 200 ms. Therefore, more and more automotive turn signals on the market have the dynamic flowing function, and LED turn signals with a dynamic effect can better alert the surrounding vehicles and pedestrians, with a more eye-catching effect in the rainy and foggy weather.

The dynamic turn signals on the market mainly implement the dynamic lighting function by a microcontroller unit (MCU), which generates a specific delay to drive an LED driver circuit. More specifically, as shown in FIG. 1, when the driver toggles a turn signal switch, a body control module (BCM) of the vehicle generates a 12 V power supply signal with 1 Hz and 50% duty cycle, to drive the LED circuit to work. When the power supply voltage increases, a low dropout (LDO) regulator circuit starts the MCU, which generates a plurality of delay circuits to control the plurality of LED drivers to light up the LEDs, achieving the effect of flowing light up. After waiting for 500 ms, the MCU enters a new start-up cycle. Due to the high cost of the MCU in this method, and the need for software programming and complex peripheral circuit, the dynamic turn signals have high cost.

Therefore, it is expected to provide a new type of dynamic automotive turn signal circuit to meet the needs of high accuracy and flexible adjustment and reduce the MCU hardware costs and software development and maintenance costs.

SUMMARY

This application is provided to introduce in simplified form a selection of concepts that are further described in the detailed description. This application is not intended to identify key features or essential features of the claimed protected subject matter, nor is it intended to limit the scope of the claimed protected subject matter.

The purpose of this application is to provide an improved dynamic automotive turn signal circuit to facilitate flexible adjustment and reduce production and maintenance costs. The above and other purposes are implemented by the features of the independent claims. Further forms of implementation are apparent from the dependent claims, the specification and the accompanying drawings.

According to a first aspect of this application, a dynamic automotive turn signal circuit is provided, including: at least one drive control module configured to receive a power supply signal from a BCM to start operation, where the drive control module outputs first control signals at different delays through a delay unit as well as an LED light set connected to the drive control module and lit based on the first control signals.

Optionally, a plurality of delay units are provided, and the plurality of delay units are in a one-to-one correspondence with the plurality of drive control modules.

Optionally, the delay units each may include a first resistor, where a first terminal of the first resistor is connected to the drive control module and a second terminal is connected to a reference low voltage node.

Optionally, the first resistors have different resistance values.

Optionally, the resistance values of the first resistors increase with an equal difference.

Optionally, the LED light set turns off after lit for a fixed time.

Optionally, the drive control module outputs second control signals at different delays through the delay unit; and the LED light set turns off based on the second control signals.

Optionally, a plurality of delay units are provided, and the plurality of delay units are in a one-to-one correspondence with the plurality of drive control modules.

Optionally, the delay unit may further include: a second resistor, where a first terminal of the second resistor is connected to the drive control module and a second terminal is connected to the reference low voltage node.

Optionally, the second resistor has different resistance values.

Optionally, the drive control module may include: a first comparator, where a first input terminal of the first comparator is connected to the first resistor and a second input terminal is fed with a first voltage; a first switch transistor, where a control terminal of the first switch transistor is connected to an output terminal of the first comparator, a first polarity terminal receives the power supply signal, and a second polarity terminal is connected to the first resistor; a second switch transistor, where a control terminal of the second switch transistor is connected to the output terminal of the first comparator and a first polarity terminal receives the power supply signal; a first capacitor, where a first terminal of the first capacitor is connected to a second polarity terminal of the second switch transistor and a second terminal is connected to a reference low voltage node; a third switch transistor, where a first polarity terminal of the third switch transistor is connected to the first terminal of the first capacitor and a second polarity terminal is connected to the reference low voltage node; and a second comparator, where a first input terminal of the second comparator is connected to the first polarity terminal of the third switch transistor, a second input terminal is fed with a second voltage, an output terminal is connected to the control terminal of the second switch transistor, and the output terminal of the second comparator outputs the first control signal.

Optionally, a time interval between the first signal of the first control signals and the last signal of the first control signals generated by the drive control module receiving the power supply signal is no longer than 200 ms at most.

Optionally, a delay range among the first control signals generated by the drive control module is 0 ms to 200 ms.

According to a second aspect of this application, a dynamic automotive turn signal system is provided, including: a power supply configured to provide a power supply voltage; a BCM configured to receive the power supply voltage and output a power supply signal; and the dynamic automotive turn signal circuit described above, electrically connected to the BCM to receive the power supply signal.

According to the dynamic automotive turn signal circuit and the dynamic automotive turn signal system provided in this application, a high-precision delay circuit is disposed by using an external resistor, to achieve the dynamic flowing turn signals. In addition, the external resistor can be used to configure a turn-on delay and a turn-off delay of the internal driver chip, such that the channel turn-on time and turn-off time can be flexibly adjusted, reducing the MCU hardware costs and software development, production and maintenance costs.

BRIEF DESCRIPTION OF THE DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of this application, and those of ordinary skill in the art may still derive other accompanying drawings from these accompanying drawings without creative efforts.

The same reference numerals below indicate same features or at least features with same functions.

DETAILED DESCRIPTION OF THE EMBODIMENTS

The technical solutions in the embodiments of this application are described below with reference to the accompanying drawings in the embodiments of this application. Apparently, the described embodiments are merely some rather than all of the embodiments of this application. All other embodiments obtained by those of ordinary skill in the art based on the embodiments of this application without creative efforts should fall within the protection scope of this application.

It should be understood that A and B are connected/coupled in the embodiments of this application means that A and B are connected in series or in parallel, or that A and B are connected through another device, which is not limited in the embodiments of this application.

Figure 1:
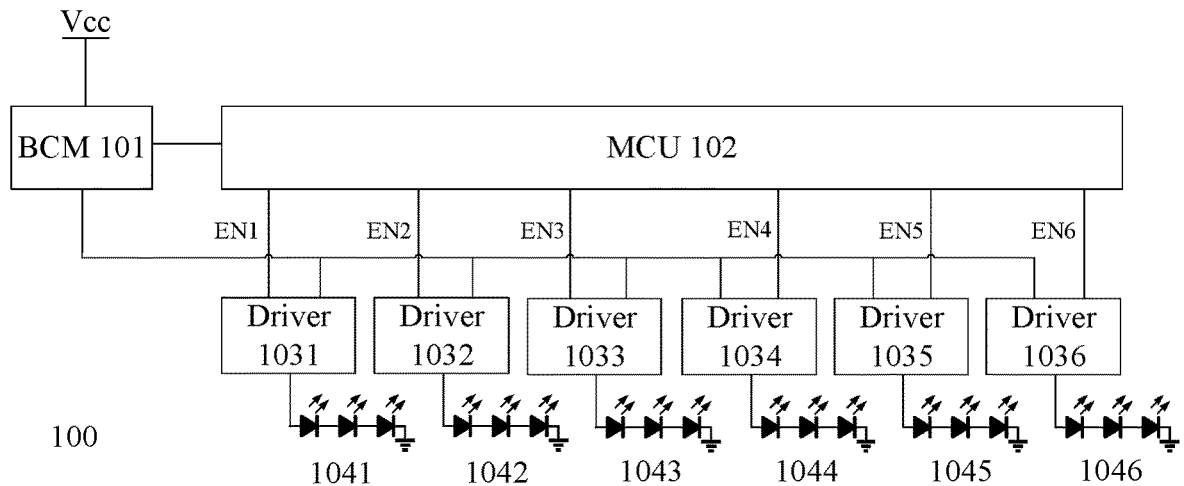
FIG. 1 is a schematic circuit diagram of a dynamic automotive turn signal in the prior art.

FIG. 1 is a schematic circuit diagram of a dynamic automotive turn signal in the prior art. As shown in FIG. 1, dynamic automotive turn signal system 100 includes BCM 101 and a dynamic automotive turn signal circuit. The existing dynamic automotive turn signal circuit includes MCU 102, six driver circuit modules (1031-1036), and six LED light strings (1041-1046). In an example, when a driver toggles a turn signal switch, the BCM 100 generates a 12 V voltage signal with 1 Hz and 50% duty cycle, to drive an LED circuit to work. When a power supply voltage increases, the MCU 101 starts and generates a plurality of delay signals, to control the plurality of driver circuit modules to generate drive currents to light the LED light strings. Different delay signals have different delays, such that the flowing light effect is realized. When the power supply voltage is set low, the LED module is powered down and enters into a new start-up cycle after waiting for 500 ms. According to regulations, all the LED light strings need to be lit within 200 ms, therefore. Therefore, delays of the channels need to be adjusted accordingly for turn signal modules of different light strings.

Figure 2:
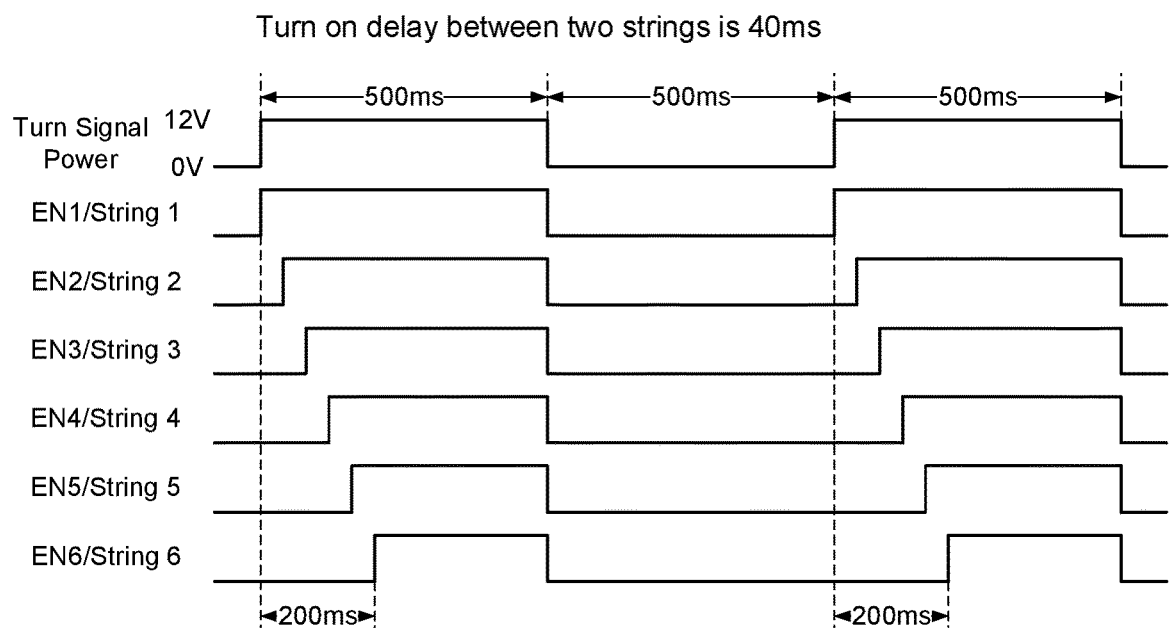
FIG. 2 is a control timing diagram of a dynamic automotive turn signal in the prior art.

FIG. 2 is a control timing diagram of a dynamic automotive turn signal in the prior art. As shown in FIG. 2, when a driver toggles a turn signal switch, BCM 100 generates a 12 V voltage signal with 1 Hz and 50% duty cycle. When the power supply voltage increases, MCU 101 starts and generates six delay signals. For example, a control signal for the first LED light string controls the LED light string to be lit directly, a control signal for the second LED light string is sent out 40 ms later to control the LED light string to be lit, a control signal for the third LED light string is sent out 80 ms later, until a control signal for the sixth LED light string is sent out 200 ms later and the sixth LED light string is lit. All the light strings are lit within 200 ms according to the regulations.

The dynamic automotive turn signal is controlled by using the MCU in the prior art. After receiving the voltage signal from the BCM, the MCU needs to send different delay control signals according to the requirements. This step needs to be implemented through programming, which greatly increases the production and maintenance costs of the dynamic automotive turn signal.

The present disclosure provides an improved dynamic automotive turn signal circuit. A high-precision delay circuit is disposed by using an external resistor, to achieve the dynamic flowing turn signals. In addition, the external resistor can be used to configure a turn-on delay and a turn-off delay of the internal driver chip, such that the channel turn-on time and turn-off time can be flexibly adjusted, reducing the MCU hardware costs and software development, production and maintenance costs.

Figure 3:
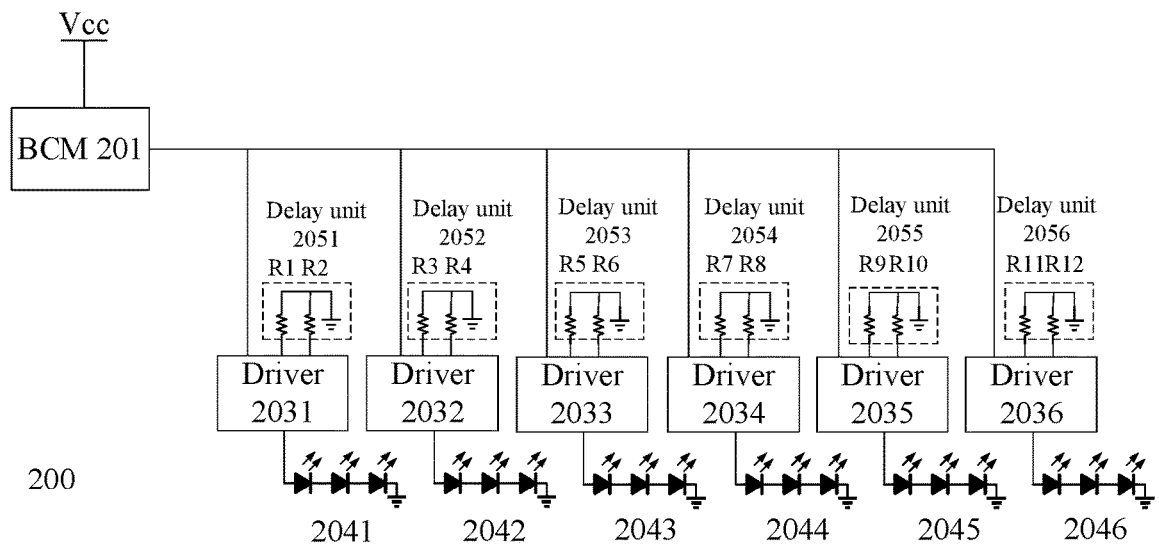
FIG. 3 is a schematic structural diagram of a circuit according to an embodiment of this application.

FIG. 3 is a schematic structural diagram of a circuit according to an embodiment of this application. As shown in FIG. 3, dynamic automotive turn signal system 200 includes BCM 201 and a dynamic automotive turn signal circuit. In an example, the dynamic automotive turn signal circuit includes first drive control module 2031, second drive control module 2032, third drive control module 2033, fourth drive control module 2034, fifth drive control module 2035, sixth drive control module 2036, first LED light set 2041, second LED light set 2042, third LED light set 2043, fourth LED light set 2044, fifth LED light set 2045, sixth LED light set 2046, first delay unit 2051, second delay unit 2052, third delay unit 2053, fourth delay unit 2054, fifth delay unit 2055, and sixth delay unit 2056. In an example, when a driver toggles a turn signal switch, the BCM 201 outputs a power supply signal to the first drive control module 2031. The first delay unit 2051 includes first resistor R1 and second resistor R2, the first resistor R1 serves as a delay unit for circuit turn-on and the second resistor R2 serves as a delay unit for circuit turn-off. Resistance values of the first resistor R1 and the second resistor R2 are set, and a time for the first drive control module 2031 to output the voltage signal or cut off the voltage signal may be set. After receiving the power supply signal for a certain time, the first drive control module 2031 outputs the first control signal to the first LED light set 2041, to light the first LED light set 2041. The control logic of the second drive control module 2032 to the sixth drive control module 2036 is the same as that of the first drive control module 2031, and details are not repeated here.

Optionally, each drive control module corresponds to one delay unit, and the delay unit includes the first resistor and the second resistor. The drive control module delays the circuit turn-on time through the first resistor and delays the turn-off time through the second resistor. In an example, the first resistors corresponding to the drive control modules have different resistance values, and may be resistors with equally incremental resistance values obtained by calculation. The circuits are lit at 40 ms intervals after powering up at the same time, achieving the effect of flowing light. The resistors may alternatively have incremental resistance values obtained by calculation. Because the automotive turn signal in the strip design has an arc shape, the time intervals for lighting the LED light sets may be set unequal. For example, in the arc area, the LED light set is lit with a shorter time interval, achieving a smoother flowing light effect.

It can be understood that the above description is an example of the drive control module in the embodiments of this application, the embodiments of this application are not limited hereto, and there may be other ways of extension and variation.

For example, the plurality of drive control modules may be integrated in a chip, and delays for outputting the voltage signals or cutting off the voltage signals may be set by using one resistor, to send a plurality of control signals to control different LED light strings.

Figure 4:
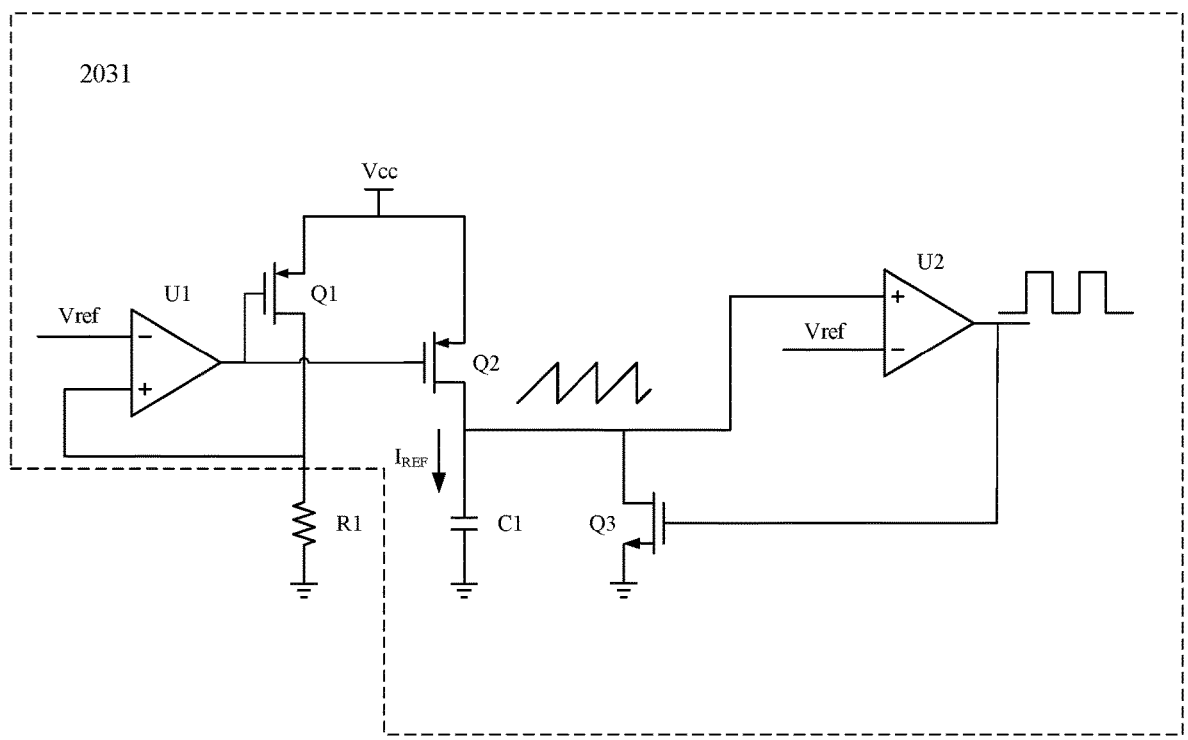
FIG. 4 is a schematic structural diagram of a circuit of a drive control module according to the embodiment in FIG. 3.

Based on an exemplary configuration, FIG. 4 is a schematic structural diagram of the drive control module according to the embodiment in FIG. 3. As shown in FIG. 4, the drive control module includes first comparator U1, second comparator U2, first switch transistor Q1, second switch transistor Q2, third switch transistor Q3, and first capacitor C1. A first input terminal of the first comparator U1 is connected to the first resistor R1 and a second input terminal is fed with a first voltage. A control terminal of the first switch transistor Q1 is connected to an output terminal of the first comparator U1, a first polarity terminal receives the voltage signal, and a second polarity terminal is connected to the first resistor R1. A control terminal of the second switch transistor Q2 is connected to the output terminal of the first comparator U1 and a first polarity terminal receives the voltage signal. A first terminal of the first capacitor C1 is connected to a second polarity terminal of the second switch transistor Q2 and a second terminal is connected to a reference low voltage node. A first polarity terminal of the third switch transistor Q3 is connected to the first terminal of the first capacitor C1 and a second polarity terminal is connected to the reference low voltage node. A first input terminal of the second comparator U2 is connected to the first polarity terminal of the third switch transistor Q3, a second input terminal is fed with a second voltage and an output terminal is connected to the control terminal of the second switch transistor Q2. The output terminal of the second comparator U2 outputs a voltage signal with a delay. As shown in FIG. 4, a resistance value of the first resistor R1 is inversely proportional to a charging current $I_{REF}$ to the first capacitor C1, and the first capacitor C1 receives the charging current to generate a capacitor voltage. The third switch transistor Q3 is connected to a side of and shares a reference point with the first capacitor C1, to reset the voltage of the first capacitor C1. The control terminal of the third switch transistor Q3 is connected to the output terminal of the second comparator U2. The first input terminal of the second comparator U2 receives the capacitor voltage and the second input terminal receives the second voltage. The second comparator U2 receives the voltage of the first capacitor C1 and compares it with the second voltage. After the first capacitor C1 is charged by the charging current for a period of time and reaches the second voltage, the second comparator U2 outputs a signal to turn on the third switch transistor Q3 to bleed the capacitor voltage of the first capacitor C1. At the same time, the second comparator U2 outputs a square waveform as the output power supply signal.

It can be understood that the reference low voltage node described above is a negative terminal of the automotive battery connected to the iron part or the automotive body. The above description is an example of the drive control module in the embodiments of this application, the embodiments of this application are not limited hereto, and there may be other ways of extension and variation.

For example, the resistors and capacitors provided in the embodiments of this application may be capacitor elements and resistor elements with lumped parameters, or other equivalent elements that function similarly to the capacitors and resistors. The equivalent structures described herein are, for example, but not limited to, structures that provide inductive impedance and/or capacitive impedance such as microstrip lines, varactors, or conductor structures with certain patterns.

Optionally, this application further provides a dynamic automotive turn signal system including: a power supply configured to provide a power supply voltage; a BCM configured to receive the power supply voltage and output a power supply signal; and the dynamic automotive turn signal circuit described above, electrically connected to the BCM to receive the power supply signal.

Persons of ordinary skill in the art may realize that with reference to the structures and methods described in the embodiments disclosed in the specification, different configuration methods or adjustment methods may be used to implement the described functions for each structure or a variation thereof, but such implementation should not be considered to be beyond the scope of this application. In addition, it should be understood that in the embodiments of this application, the connections among the components of the comparator in the drawings described above are illustrative examples and do not impose any restrictions on the embodiments of this application.

In an example, this application further provides a dynamic automotive turn signal system. Optionally, the dynamic automotive turn signal system includes: a power supply configured to provide a power supply voltage; a BCM configured to receive the power supply voltage and output a start signal; and the dynamic automotive turn signal circuit as described above, electrically connected to the BCM to receive the start signal.

Any range or device value presented in this specification can be extended or changed without loss of the effect sought. Furthermore, any embodiment may be combined with another embodiment that is not expressly prohibited.

Although the subject matter has been described in language specific to structural features and/or actions of the method, it should be understood that the subject matter defined in the appended claims is not limited to the specific features or actions described above. Rather, the specific features and actions described above are disclosed as examples of the claims, and other equivalent specific and actions are intended to fall within the scope of the claims.

It should be understood that the benefits and advantages mentioned above may involve one or more embodiments.

The embodiments are not limited to those that solve any or all of the problems or have any or all of the benefits and advantages. It should also be understood that a reference to "a" project may refer to one or more of those projects.

In addition, terms "include", "comprise", or any other variations thereof are intended to cover non-exclusive including, so that a process, a method, an article, or a device including a series of elements not only includes those elements, but also includes other elements that are not explicitly listed, or also includes inherent elements of the process, the method, the article, or the device. Without more restrictions, the elements defined by the sentence "including a . . . " do not exclude the existence of other identical elements in a process, method, article, or device including the elements.

It should be understood that the above description is given as an example only and that various modifications can be made by those skilled in the art. The above description, examples and data provide a complete description of the structure and use of the exemplary embodiments. Although various embodiments with a degree of specificity have been described above, or with reference to one or more individual embodiments, those skilled in the art may make a variety of changes to the disclosed embodiments without departing from the spirit or scope of this specification.

What is claimed is:

1. A dynamic automotive turn signal circuit, comprising:
   at least one drive control module configured to receive a power supply signal from a body control module (BCM) to start an operation, wherein the at least one drive control module outputs first control signals at different delays through at least one delay unit; and
   a light emitting diode (LED) light set connected to the at least one drive control module and lit based on the first control signals,
   wherein the at least one delay unit is in a one-to-one correspondence with the at least one drive control module,
   wherein each of the at least one delay unit comprises:
      a first resistor, wherein a first terminal of the first resistor is connected to a corresponding one of the at least one drive control module, and wherein a second terminal of the first resistor is connected to a reference low voltage node,
   wherein the first resistor in each of the at least one delay unit has a different resistance value.

2. The dynamic automotive turn signal circuit according to claim 1, wherein the resistance value of the first resistor in each of the at least one delay unit increases with an equal difference.

3. The dynamic automotive turn signal circuit according to claim 2, wherein the LED light set turns off after lit for a fixed time.

4. The dynamic automotive turn signal circuit according to claim 1, wherein the LED light set turns off after lit for a fixed time.

5. The dynamic automotive turn signal circuit according to claim 1, wherein the at least one drive control module outputs second control signals at different delays through the at least one delay unit; and
   the LED light set turns off based on the second control signals.

6. The dynamic automotive turn signal circuit according to claim 1, wherein a time interval between the first signal of the first control signals and the last signal of the first control signals generated by the at least one drive control module receiving the power supply signal is no longer than 200 ms.

7. The dynamic automotive turn signal circuit according to claim 1, wherein a delay range among the first control signals generated by the at least one drive control module is 0 ms to 200 ms.

8. A dynamic automotive turn signal system, comprising:
   a power supply configured to provide a power supply voltage;
   a body control module (BCM) configured to receive the power supply voltage and output a power supply signal; and
   the dynamic automotive turn signal circuit according to claim 1, electrically connected to the BCM to receive the power supply signal.

9. A dynamic automotive turn signal circuit, comprising:
   at least one drive control module configured to receive a power supply signal from a body control module (BCM) to start an operation, wherein the at least one drive control module outputs first control signals at different delays through at least one delay unit; and
   a light emitting diode (LED) light set connected to the at least one drive control module and lit based on the first control signals,
   wherein the at least one drive control module outputs second control signals at different delays through the at least one delay unit,
   the LED light set turns off based on the second control signals,
   wherein the at least one delay unit is in a one-to-one correspondence with the at least one drive control module, and
   wherein each of the at least one delay unit further comprises:
      a resistor, wherein a first terminal of the resistor is connected to the corresponding one of the at least one drive control module, and a second terminal of the resistor is connected to a reference low voltage node.

10. The dynamic automotive turn signal circuit according to claim 9, wherein the resistor in each of the at least one delay unit has a different resistance value.

11. A dynamic automotive turn signal circuit, comprising:
    at least one drive control module configured to receive a power supply signal from a body control module (BCM) to start an operation, wherein the at least one drive control module outputs first control signals at different delays through at least one delay unit; and
    a light emitting diode (LED) light set connected to the at least one drive control module and lit based on the first control signals,
    wherein each of the at least one drive control module comprises:
       a first comparator, wherein a first input terminal of the first comparator is connected to the first resistor, and a second input terminal of the first comparator is fed with a first voltage;
       a first switch transistor, wherein a control terminal of the first switch transistor is connected to an output terminal of the first comparator, a first polarity terminal of the first switch transistor receives the power supply signal, and a second polarity terminal of the first switch transistor is connected to the first resistor;
       a second switch transistor, wherein a control terminal of the second switch transistor is connected to the output terminal of the first comparator, and a first polarity terminal of the second switch transistor receives the power supply signal;

a first capacitor, wherein a first terminal of the first capacitor is connected to a second polarity terminal of the second switch transistor, and a second terminal of the first capacitor is connected to a reference low voltage node;

a third switch transistor, wherein a first polarity terminal of the third switch transistor is connected to the first terminal of the first capacitor, and a second polarity terminal of the third switch transistor is connected to the reference low voltage node; and a second comparator, wherein a first input terminal of the second comparator is connected to the first polarity terminal of the third switch transistor, a second input terminal of the second comparator is fed with a second voltage, an output terminal of the second comparator is connected to the control terminal of the second switch transistor, and the output terminal of the second comparator outputs the first control signal.

* * * * *